Patented Apr. 8, 1952

2,592,303

UNITED STATES PATENT OFFICE 2,592,303

THIO-BIS-ACYLAMINO PYRAZOLONE COUPLERS FOR COLOR PHOTOGRAPHY

Anthony Loria, Paul W. Vittum, and Arnold Weissberger, Rochester, N. Y., assignors to Eastman Kodak Company, Rochester, N. Y., a corporation of New Jersey No Drawing. Application November 12, 1948, Serial No. 59,776

6 Claims. (Cl. 95—6)

This invention relates to photographic color-forming compounds and particularly to thio-bis-acylamino pyrazolone couplers.

The formation of colored photographic images by coupling the development product of aromatic amino developing agents with color forming or coupling compounds is well known. In these processes the subtractive process of color formation is ordinarily used and the image dyes are intended to be of the complementary primary colors cyan or blue-green, magenta, and yellow. The couplers which produce the cyan dyes are usually phenols or naphthols, those producing the magenta dyes are ordinarily pyrazolones or cyano acetyl compounds, and those producing the yellow dyes are ordinarily compounds containing a methylene group having two carbonyl groups attached to it. The dyes produced by coupling are azomethines, indamines or indophenols, depending upon the composition of the coupler and of the developer.

One disadvantage of many couplers is that the dyes produced from them have inadequate or improper light absorption characteristics or are unstable to heat or light or both. Another disadvantage of some couplers is that when incorporated in photographic emulsion layers, the residual coupler remaining in the layer after formation of the dye image becomes discolored in time or affects the stability of the dye image in the layer so that it becomes faded or discolored.

It is therefore an object of the present invention to provide novel photographic coupler compounds producing dyes which have desirable properties with respect to heat and light stability. A further object is to provide novel couplers capable of producing magenta dye images in photographic emulsion layers. A still further object is to provide novel couplers capable of producing in photographic layers magenta dyes having the desired light transmission characteristics for three-color photography. A still further object is to provide couplers for incorporation in photographic emulsion layers which do not cause appreciable bleaching or fading of the dye image formed in the layer. Other objects will appear from the following description of our invention.

These objects are accomplished by using as couplers compounds of the following structure:

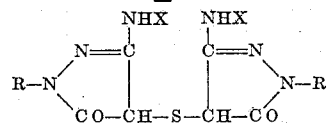

in which R is an aryl group, that is, phenyl, substituted phenyl, α-naphthyl, or β-naphthyl, and X is a carboxylic acid acyl group.

Porter and Weissberger U. S. Patent 2,369,489, granted February 13, 1945, describes acylamino pyrazolone couplers. These produce magenta dyes having good light absorption and stability characteristics. However, the residual coupler tends to cause bleaching or fading of the dye image when incorporated in emulsion layers. The couplers which we now propose to use materially decrease this tendency of the coupler to cause fading of the dye image.

Compounds illustrating our invention are as follows:

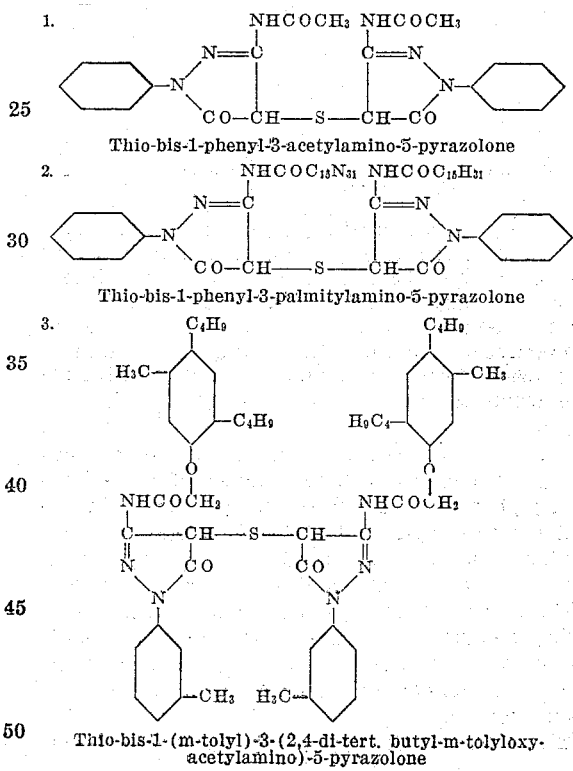

1. Thio-bis-1-phenyl-3-acetylamino-5-pyrazolone

2. Thio-bis-1-phenyl-3-palmitylamino-5-pyrazolone

3. Thio-bis-1-(m-tolyl)-3-(2,4-di-tert. butyl-m-tolyloxy-acetylamino)-5-pyrazolone

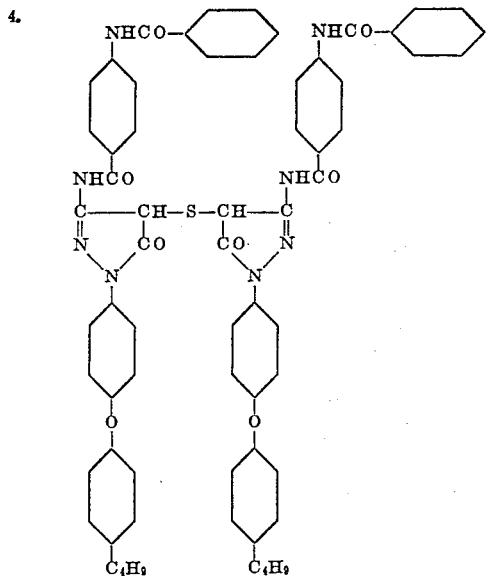

Thio-bis-1-[p-(p'-tert. butyl-phenoxy)phenyl]-3-[p-(benzoylamino)-benzoylamino]-5-pyrazolone

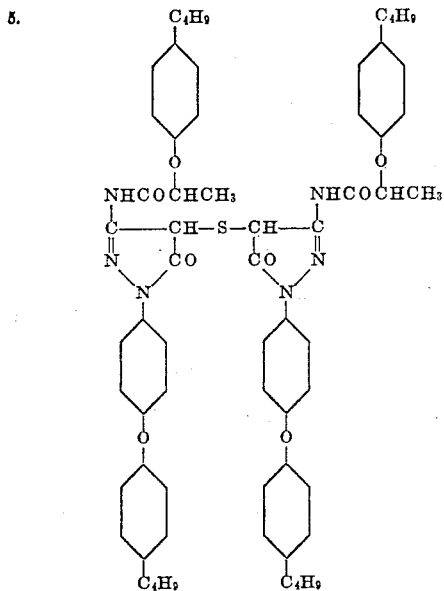

Thio-bis-1-[p-tert.-butylphenoxy)-phenyl]-3-[α-(p-tert.-butylphenoxy)-propionamido]-5-pyrazolone The preparation of acylamino pyrazolone couplers is described in the Porter and Weissberger U. S. Patent 2,369,489 and we may use as intermediates any of the acylamino pyrazolone couplers described in that patent. Our couplers are prepared by treating a solution of the acylamino pyrazalone coupler in chloroform with sulfur dichloride as shown by the following specific example.

To a chloroform solution, made up by dissolving in the cold 26.3 g. (0.05 mole) of 1-[p-(tert-butylphenoxy)-phenyl]-3 - [α(p - tert. - butylphenoxy)-propionamido]-5-pyrazolone in 200 ml. of chloroform, was added in one hour with stirring 2.5 g. (0.025 mole) of sulfur dichloride in 50 ml. of chloroform at room temperature. Stirring was continued for one hour after the addition was completed and then the reaction mixture was refluxed gently for 4 hours. The solvent was removed under reduced pressure and the solid obtained was crystallized from 50-60 parts of methanol. The yield of crude product was 25.8 g.

The purified material showed a melting point of 134–136°.

Our couplers may be used in the developing solutions described in Mannes and Godowsky U. S. Patent 2,113,329 or Mannes, Godowsky and Wilder U. S. Patent 2,252,718, or they may be incorporated in the sensitive emulsion layer as described in Fischer U. S. Patent 1,055,155, Mannes and Godowsky U. S. Patent 2,304,940 or Jelley and Vittum U. S. Patent 2,322,027. Our couplers find their greatest utility, however, when incorporated in the sensitive emulsion layer.

Compound 1 is an example of one of our couplers which may be used in the developing solution and compounds 2 to 5 are examples of couplers which may be incorporated in the sensitive emulsion layer.

Compounds 3 to 5 above and thio-bis compounds derived from compounds 38, 39, 41, 43 to 46, 48, 50 and 52 of Porter and Weissberger U. S. Patent 2,369,489 are especially useful for incorporation in the emulsion layer in the manner described in Jelley and Vittum U. S. Patent 2,322,027. One of the requirements of this process is that the coupler should have a high solubility in the coupler solvent used in the process and these compounds possess an ether linkage in one or more positions of the pyrazolone nucleus so that improved solubility and utility in the Jelley and Vittum process are brought about.

When our couplers are incorporated in a photographic emulsion layer as described above, the following developing solution may be used to form a dye image in the layer.

| | Grams |
|---|---|
| 2-Amino-5-diethylaminotoluene hydrochlororide | 2 |
| Sodium sulfite (anhydrous) | 2 |
| Sodium carbonate (anhydrous) | 20 |
| Potassium bromide | 1 |
| Water to 1 liter | |

In the development of exposed photographic silver halide emulsion layers, using the couplers of our invention, any color-forming developer containing a primary amino group may be used. These include developers having two primary amino groups as well as those having one of the amino groups substituted or having substituents in the ring such as alkyl phenylenediamines. These compounds are usually used in the salt form such as the hydrochloride or the sulfate which are more stable than the amines themselves. The suitable compounds are diethyl-p-phenylenediamine hydrochloride, monomethyl-p-phenylenediamine hydrochloride, dimethyl-p-phenylenediamine hydrochloride, and 2-amino-5-diethylaminotoluene hydrochloride. P-amino phenols and their substitution products may also be used where the amino group is unsubstituted. All of these developers have an unsubstituted amino group which enables the oxidation products of the developer to couple with the color-forming compounds to form a dye image.

Our development process may be employed for the production of colored photographic images in layers of gelatin or other water-permeable colloidal carriers, such as albumin, colloidion, organic esters of cellulose, or synthetic resins. The carrier may be supported by a transparent medium such as glass, a cellulose ester or synthetic resin or a non-transparent reflecting medium such as paper or an opaque cellulose ester. The emulsion may be coated as a single layer on the support or as superposed layers on one or both sides of the support. The superposed layers may be differentially sensitized in the well-known manner.

The examples and compounds set forth in the present specification are illustrative only and it is to be understood that our invention is to be taken as limited only by the scope of the appended claims.

We claim:

1. The method of producing a magenta colored photographic image in a gelatino-silver halide emulsion layer which comprises exposing the layer and developing it with a primary aromatic amino developing agent in the presence of a coupler compound having the formula:

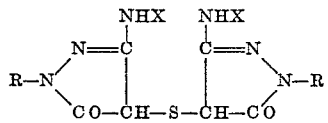

where R is an aryl group and X is a carboxylic acid acyl group.

2. A photographic emulsion for forming colored images comprising a water-permeable, colloidal carrier containing a sensitive silver halide and a coupler compound having the formula:

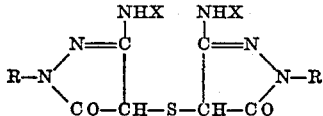

where R is an aryl group and X is a carboxylic acid acyl group.

3. A photographic emulsion for forming colored images comprising a water-permeable, colloidal carrier containing a sensitive silver halide and a coupler compound having the formula:

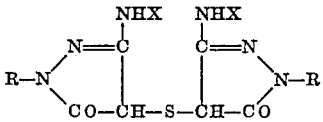

where R is an aryl group and X is a carboxylic acid acyl group and the compound contains an ether linkage in at least one of the 1 and 3 positions of the pyrazolone nucleus.

4. A photographic emulsion for forming colored images comprising a water-permeaable, colloidal carrier containing a sensitive silver halide and a coupler compound having the formula:

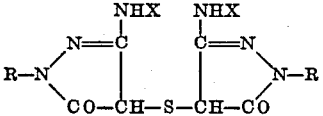

where R is a phenoxyphenyl group and X is a carboxylic acid acyl radical containing an ether linkage.

5. A photographic emulsion for forming colored images comprising a water-permeable, colloidal carrier containing a sensitive silver halide and a coupler compound having the formula:

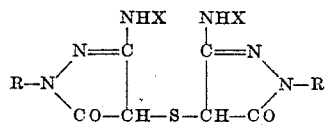

where R is a phenoxyphenyl group and X is a propionyl group containing a phenoxy substituent.

6. A photographic emulsion for forming colored images comprising a water-permeable, colloidal carrier, containing a sensitive silver halide and a coupler compound having the formula:

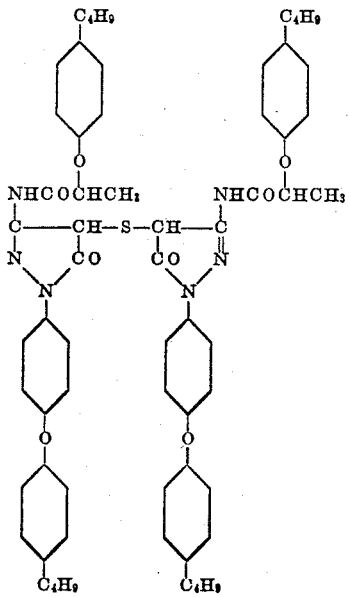

ANTHONY LORIA.
PAUL W. VITTUM.
ARNOLD WEISSBERGER.

REFERENCES CITED

The following references are of record in the file of this patent:

UNITED STATES PATENTS

| Number | Name | Date |
|---|---|---|
| 2,369,489 | Porter et al. | Feb. 13, 1945 |
| 2,387,145 | Gluck | Oct. 16, 1945 |

FOREIGN PATENTS

| Number | Country | Date |
|---|---|---|
| 566,520 | Great Britain | Jan. 2, 1945 |